3,347,931
PREPARATION OF ORGANOBORON
COMPOUNDS
Paul R. Wunz, Jr., Richland Township, and Albert F. Stang, Harmony, Pa., assignors to Callery Chemical Company, Pittsburgh, Pa., a corporation of Pennsylvania
No Drawing. Filed Aug. 14, 1958, Ser. No. 756,058
17 Claims. (Cl. 260—606.5)

This application is a continuation-in-part of our application Serial Number 484,586, filed January 27, 1955, now abandoned.

This invention relates to the preparation of organoboron compounds, and in particular it relates to the preparation of organoboron compounds upon reaction of an alkene and halogenated organic compounds with volatile boron hydrides having at least four boron atoms per molecule.

It is an object of this invention to provide a method for preparing organoboron compounds that may be classed as derivatives of volatile higher boron hydrides.

Another object of the invention is to provide a method for preparing organoboron compounds such as hydrocarbon-boron compounds in accordance with the foregoing object by which a variety of hitherto unknown boron-containing organic compounds can be prepared.

A specific object is to provide an improved method for preparing aliphatic hydrocarbon derivatives of volatile higher boron hydrides.

An additional specific object is to provide new alkylated boron hydrides having at least four boron atoms per molecule.

These and other objects are attained with our discovery that volatile higher boron hydrides react with halogenated hydrocarbons in the presence of an aluminum halide and thereby from organoboron compounds. We have also discovered that an aluminum halide will catalyze the reaction of volatile higher boron hydrides and alkenes thereby forming alkyl derivatives of these boron hydrides. In the foregoing manner, a variety of organoboron compounds can be readily produced. Moreover, alkyl derivatives of volatile higher boron hydrides can be produced under more moderate conditions than was heretofore possible.

The boron containing reactants that are used in our invention are volatile higher boron hydrides containing 4 to 12 boron atoms per molecule. Examples of these hydrides include tetraborane, pentaborane-9, pentaborane-11, hexaborane and decaborane. The hydrides can be used in substantially pure form. However, mixtures of the hydrides as obtained, for example, by a pyrolysis of diborane, are generally a more economical starting material and constitute the preferred reactant for many purposes, e.g. where the identity of the product species is not of primary importance, as in a fuel application. It should be understood that materials other than the hydrides may be present along with this reactant as long as they do not interfere deleteriously with this invention.

The halogenated organic compounds that are used in the invention are halogenated hydrocarbons wherein the hydrocarbon portion of the molecule can be aromatic, cycloaliphatic or aliphatic, and combinations of the foregoing such as cyclic hydrocarbons containing one or more side chains. These compounds can be saturated or unsaturated, the latter in the rings or side chains or both. While the number or disposition of carbon atoms present is not known to affect this invention, for most purposes compounds containing a maximum of about 25 and suitably 18 carbon atoms per molecule are used. Typical halogenated hydrocarbons include, by way of example, such halogenated aromatics as benzyl chloride, phenylbromopentane, chlorobenzene, xylyl chloride, chlorotetramethylbenzene, iodoheptylbenzene, 1 - chloro - 2-phenylethylene and the like. Typical cycloaliphatic halides include cyclohexyl chloride and cyclopentyl bromide, while examples of aliphatic halides are chloroprene, allyl bromide, vinyl chloride, dodecyl bromide, octadecyl chloride and the like. The compounds corresponding to the foregoing but containing a plurality of halogens can also be used. For example we have successfully used compounds such as carbon tetrachloride and 1,3-dichloropropane as a reactant to obtain boron hydride derivatives. While any of the halogens may be present in the halogenated hydrocarbons, chlorides and bromides generally are preferred for reasons of economics and handling considerations.

In the process involving the hydrides and alkenes, while any alkene may be used, it is generally preferred to use alkenes with a maximum of about 25 carbon atoms, and usually not more than 15 carbon atoms, per molecule for they include the most common materials. Typical alkenes are ethylene, propene, hexene, methyl butylene, butadiene, 1-propyl-3-decene, octadecylene and the like.

The reactions in accordance with this invention are carried out in the presence of an aluminum halide catalyst. Aluminum chloride and aluminum bromide are two especially suitable catalyst. These are materials of commerce and the commercially available proprietary catalysts of this general type usually may be used as such in practicing this invention.

The invention will be described further in conjunction with the following examples. It should be understood that the details disclosed are given by way of illustration.

*Example 1*

Monoethyldecaborane ($C_2H_5B_{10}H_{13}$) was prepared by reacting ethyl bromide and decaborane in the presence of aluminum chloride using carbon disulfide as a solvent. A 3-necked, round bottomed flask fitted with a magnetic stirrer, reflux condenser thermometer and dropping funnel was charged with 13.4 g. (0.11 mol) of decaborane, 6 g. of aluminum chloride and 125 ml. of carbon disulfide. The dropping funnel was charged with 10.9 g. (0.10 mol) of ethyl bromide. The contents of the flask were warmed to the reflux temperature of $CS_2$ and the $C_2H_5Br$ was added dropwise. Gas was evolved during the reaction. The reaction was complete in 4 hours. The product was cooled and poured on cracked ice to decompose the $AlCl_3$. The solvent layer was removed, washed and dried and the $CS_2$ removed under vacuum. About 3.7 g. of unreacted decaborane were removed by filtration. The crude filtrate, which weighed 10.1 g., was analyzed and found to contain no aluminum, halogen or sulfur. The boron and carbon content expressed in milligram atoms per gram was as follows:

| | Calculated | | Found |
|---|---|---|---|
| | $C_2H_5B_{10}H_{13}$ | $(C_2H_5)_2B_{10}H_{12}$ | |
| B | 66.7 | 56.2 | 62.8 |
| C | 13.3 | 22.4 | 16.7 |

This analysis indicates that a mixture of monoethyldecaborane and diethyldecaborane was formed in the above reaction. Distillation of this product through a falling film molecular still yielded two major fractions which are monoethyldecaborane and diethyldecaborane, respectively.

|  | Fraction 1 $C_2H_5B_{10}H_{13}$ | Fraction 2 $(C_2H_5)_2B_{10}H_{12}$ |
| --- | --- | --- |
| Analysis: |  |  |
| Boron | 65.1 | 56.0 |
| Carbon | 14.6 | 20.8 |
| Density at 25° C. in g./ml. | 0.788 | 0.830 |

*Example II*

Dimethyldecaborane $(CH_3)_2B_{10}H_{12}$, was prepared in a fashion similar to that in Example I by the action of methyl bromide on decaborane in the presence of $AlBr_3$ using $CS_2$ as a solvent. A mixture of 12.2 g. (0.1 mol) of decaborane, 10 g. of $AlBr_3$ and 100 ml. of $CS_2$ was heated to the reflux temperature of $CS_2$ and sparged with 19 g. (0.2 mol) of methyl bromide. The reaction was complete in 3½ hours after which the product was worked up as in the previous example. A 60% yield of a liquid product was obtained which analyzed 61.8 milligram atoms per gram of boron and 14.4 milligram atoms per gram of carbon which corresponds to the theoretical boron and carbon content of dimethyldecaborane.

*Example III*

In this run, 6 g. (0.05 mol) of decaborane, 33 g. (0.30 mol) ethyl bromide, and 1 g. $AlCl_3$ were reacted together at room temperature for six hours in the absence of solvent. A vigorous reaction took place accompanied by the evolution of gas. The reaction mixture was mixed with water to hydrolyze the $AlCl_3$ present. The excess ethyl bromide was removed and a liquid product obtained which analyzed B 43.2 mga./g. and C 34.8 mga./g. This analysis corresponds, within experimental error, to the analysis for tetraethyldecaborane, $(C_2H_5)_4B_{10}H_{10}$. This experiment indicates that, while the use of a suitable solvent such as $CS_2$ is desirable, the reaction will take place without solvent. Obviously, other suitable solvents could be used.

*Example IV*

In still another run, monoethylpentaborane-9

$(C_2H_5B_5H_8)$ was prepared as follows: to 28 g. of anhydrous aluminum chloride and 55 ml. (0.15 mol) of ethyl bromide was added 70 ml. (0.65 mol) of pentaborane-9 and the mixture stirred while the temperature was gradually raised to 37° C. This reaction was carried out in a nitrogen atmosphere at atmospheric pressure. The evolution of gas was noted and the reaction was continued until no more gas was liberated which required 2¾ hours. After fractional separation of the reaction mixture about 80 ml. of a liquid product was obtained. Analysis of this liquid product showed that it contained 68.6 wt. percent monoethylpentaborane-9.

*Example V*

In a similar run, monomethylpentaborane-9 $(CH_3B_5H_8)$ was prepared as follows: a round bottomed flask was charged with 34 g. (0.25 mol) of methyl iodide, 3 g. of $AlBr_3$, 2 g. of ground glass and 9.0 g. (0.14 mol) of pentaborane-9. The mixture was stirred with a magnetic stirrer and the reaction allower to proceed at room temperature and atmospheric pressure under a nitrogen atmosphere for about three hours. The product was separated from the reaction mixture under vacuum and purified by distillation through a low temperature Podbielniak column. A mass spectrometric analysis showed the product contained 95 mol percent monomethylpentaborane-9.

As shown in the above examples, the halogenated hydrocarbons and volatile higher boron hydrides react readily in the presence of aluminum halides to produce hydrocarbon derivatives of the boron hydride. The reaction products appear to form through the bonds available upon the displacement of hydrogen from the borane and the halogen from the halide reactant, hydrogen halide being split out.

Similar reactions can be carried out with the other halogenated hydrocarbons and the volatile higher boron hydrides in the presence of aluminum halides in the manner of the representative examples above. Where the halogenated hydrocarbons are solid, it generally is desirable to use a solvent and higher temperatures to facilitate contact and speed the reaction. The temperatures used should, of course, take into account the pyrolysis temperature of the borane used, for if the temperature becomes excessive some of the borane will be degraded and otherwise be unavailable for the intended reaction, thereby decreasing the yield of the desired product. Generally temperatures up to about 150° to 200° C. and higher are used. Similarly, while subatmospheric, atmospheric or superatmospheric pressures can be used, this condition of reaction also is chosen with a view to facilitating the reaction. For example, with the more volatile halides and boranes, it is usual to conduct the reaction under autogenous pressure.

The examples also show that the reaction can be carried out in a solvent as well as in the absence of a solvent. A practice that we have found satisfactory involves using the halogenated hydrocarbon itself as a solvent, when it is liquid at normal conditions or becomes liquid at the conditions of reaction. This embodiment involves simply using a large excess of halogenated hydrocarbon relative to the boron hydride present, or by providing both an alkene and halogenated hydrocarbon in the system. The excess then serves as the reaction medium; it also facilitates consumption of all the hydride added thereby resulting in a high efficiency. The reactants, as a rule, are used in a molar ratio of about 0.2 to 5 mols of the halogenated hydrocarbon per mol of borane, but other ratios can be used if desired.

The aluminum halides have also been found to catalyze the reactions of alkenes and the indicated boranes, and the following are examples thereof.

*Example VI*

Monoethylpentaborane-9 was also prepared from ethylene and pentaborane-9 by the following procedure: a 125 ml. autoclave was charged with 16 g. (0.25 mol) of pentaborane-9, 2.7 g. (.075 mol) of $C_2H_5Br$, 3 g. of $AlCl_3$ and 6.9 g. (0.24 mol) of ethylene under a nitrogen atmosphere. The autoclave was cooled to −78.9° C. to charge the reagents and the ethylene pressure was about 300 p.s.i.g. When the mixture came to room temperature, the pressure dropped to atmospheric. The autoclave was heated at 35° C. for 2 hours. The volatile portion was removed and analyzed by the mass spectrometer which showed the product contained about 50 mol percent of monoethylpentaborane-9.

*Example VII*

In another experiment, .047 mols of pentaborane-9 and .055 mol of ethylene in the gaseous state were cycled over 2.5 g. of $AlCl_3$ heated to 140–150° C. for 4 hours. The products were fractionated in a Podbielniak column. One fraction had a varpor pressure of 16 mm. at 0° C. and a boron content of 55.8 mga./g. which when compared to theoretical vapor pressure of 13 mm. at 0° C. and the theoretical boron content of 54.8 mga./g. establishes the presence of monoethylpentaborane-9. The formation of monoethylpentaborane-9 was further confirmed by infrared and mass spectrometer determination.

In other runs, the reactants were cycled back and fourth over an aluminum chloride catalyst in a reactor held at room temperature. Cycled ethylene and pentaborane-11 were fed to the reactor from a trap below room temperature, and passed to a second trap at −160° C. (liquid nitrogen cooled) upon leaving the reactor. The reaction system was at subatmospheric pressure for the entire period. The product was found to be an alkyl pentaborane-11.

The higher alkenes including branched chain alkenes can be reacted with the higher boranes, or mixtures thereof, in essentially the same manner as indicated in the examples above, thereby producing the corresponding organoboron compounds. In the alkene-borane reaction, the reaction site appears to be the double bond of the alkene, with a B–C bond forming at that point and one of the hydrogens from the borane satisfying the other bond therein. Hence the chain length or presence of side chains is not significant to the reacting system.

The data obtained in the examples above along with other related experimental evidence demonstrate the advantage of carrying out the alkene-higher borane in the presence of this catalyst. These reactions can now be carried out at more moderate pressure and temperature as a consequence of the use of the catalyst than was heretofore believed possible. For example, this reaction can be carried out at subatmospheric as well as atmospheric and superatmospheric pressure. Moreover, the temperature of reaction may be below room temperature as well as at an elevated temperature, for example, up to 100° to 150° C. The reaction is accelerated when excess alkene is used. Preferably, at least two mols of the alkene for each mol of the volatile higher boron hydride are used, and it has been found that even when a large excess of the alkene is used, for example as much as a 5 to 1 ratio, the resulting products are predominantly mono and dialkyl derivatives of the boranes used.

The products obtained in accordance with this invention are hydrocarbon derivatives of volatile higher boron hydrides which contain 4 to 12 boron atoms per molecule. The products include liquids and solids, and are useful, for example, as high energy fuels in bipropellent systems. They can be burned readily with conventional oxidizers such, for example, as air, oxygen, and the various solid peroxides, and are primarily useful in turbo jets, ram jets and rocket engines. The fuels may be used alone or in mixture with other fuels toward which they are chemically inert, e.g. most ordinary hydrocarbon fuels. These fuels have a high heat of combustion (in view of their boron content), are spontaneously flammable in air at high temperature (300° C. and higher) and have other desirable fuel properties. For example, the liquids are characterized by large liquidous range and low viscosity, and all the products evidence stability against thermal decomposition as compared with such boron fuels as diborane and the like.

In actual tests of samples of these products as fuels, they are introduced into the combustion section of a jet test engine burned with compressed air and the efficiency of combustion and output of the engine measured. Test on these materials show that they have a heat of combustion on the order of 20 percent or more greater than the best hydrocarbon fuel. The combustion efficiency was equal to JP–4 (a standard jet fuel) and the thrust of the engine per unit weight of fuel was substantially greater than the thrust obtained upon using the best hydrocarbon fuel. In comparative tests on the use of these products as fuels it has been found that the engine output is directly proportional to the heat of combustion per unit weight of fuel. Consequently, an aircraft using these materials for fuel purposes can travel proportionally further with the same load, or can carry a proportionally greater load then when filled with hydrocarbon fuels.

The solid products also can be used for fuel purposes. This can be accomplished by slurrying the solids in a hydrocarbon and burning the resulting mixture with air or oxygen, or by dispersing a solid oxidizer, such as a peroxide, in the solid and packing the material in a combustion zone, e.g. in a rocket. Ignition can be brought about electrically.

The individual compounds produced in accordance with this invention can, of course, be used for fuel purposes in the manner just described. However, being substantially pure compounds they are of more interest as portable sources of hydrogen since they contain hydrolyzable hydrogen (hydrogen bonded to boron). The hydrogen can be released by a strong acid hydrolysis with such mineral acids as HCl and $H_2SO_4$. The compounds also are convenient and portable sources of the appropriate borane which do not present the handling difficulties of the pure boron hydrides. They can be used to form various derivatives of boranes particularly wherein higher temperatures are needed in the syntheses, for these compounds evidence stability at high temperatures.

In accordance with the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. A method of preparing hydrocarbon substituted higher volatile boron hydrides which comprises reacting a compound of the group consisting of halogenated hydrocarbons and alkenes with a boron hydride containing 4 to 12 boron atoms per molecule in the presence of an aluminum halide, and recovering the resulting organoboron compound formed.

2. A method in accordance with claim 1 in which said boron hydride is decaborane.

3. A method in accordance with claim 1 in which said boron hydride is pentaborane-9.

4. A method of preparing an alkyl decaborane which comprises reacting an alkyl halide with decaborane in the presence of an aluminum halide and recovering the alkyldecaborane formed.

5. A method in accordance with claim 4 in which said lower alkyl halide is present in substantial molar excess, whereby it functions as a reaction medium.

6. A method of preparing monoethyldecaborane which comprises reacting an ethyl halide and decaborane in substantially equal molar amounts in carbon disulfide in the presence of aluminum chloride, and recovering the monoethyldecaborane formed.

7. A method of preparing dimethyldecaborane which comprises reacting methyl bromide and decaborane in carbon disulfide in the presence of aluminum tribromide and separating and recovering the dimethyldecaborane formed.

8. A method according to claim 7 in which the molar ratio of methyl bromide to decaborane used is 2 to 1.

9. A method of preparing monoethylpentaborane-9 which comprises reacting ethyl bromide and pentaborane-9 in the presence of aluminum chloride and separating and recovering from the reaction mixture the monoethylpentaborane-9 formed.

10. A method of preparing monomethylpentaborane-9 which comprises reacting methyl iodide and pentaborane-9 in the presence of aluminum chloride and separating and recovering the monomethylpentaborane-9 formed.

11. A method of preparing monoethylpentaborane-9 which comprises heating a mixture of ethyl bromide, pentaborane-9, ethylene and aluminum chloride and recovering the resulting monoethylpentaborane-9.

12. A method of preparing monoethylpentaborane-9 which comprises reacting ethylene and pentaborane-9 in the gaseous state in the presence of aluminum trichloride at an elevated temperature and separating and recovering the monoethylpentaborane-9 formed.

13. Dimethyldecaborane, $(CH_3)_2B_{10}H_{12}$.

14. Ethyldecaborane according to the formula

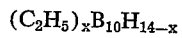

where $x$ is an integer from 1 to 4.

15. A method of preparing hydrocarbon substituted higher volatile boron hydrides which comprises reacting a lower alkyl halide with a boron hydride containing 4 to 10 boron atoms per molecule in the presence of an aluminum halide, and recovering the resulting organoboron compound formed.

16. A method for the preparation of organoboranes which comprises reacting decaborane with an allyl halide in the presence of a catalytic amount of an aluminum halide.

17. A method for the preparation of organoboranes which comprises reacting decaborane with a vinyl halide in the presence of a catalytic amount of an aluminum halide.

No references cited.

TOBIAS E. LEVOW, Primary Examiner.

LEON D. ROSDOL, WILLIAM G. WILES, ROGER L. CAMPBELL, Examiners.

L. A. SEBASTIAN, W. F. W. BELLAMY,
Assistant Examiners.